United States Patent Office 3,365,645
Patented Jan. 23, 1968

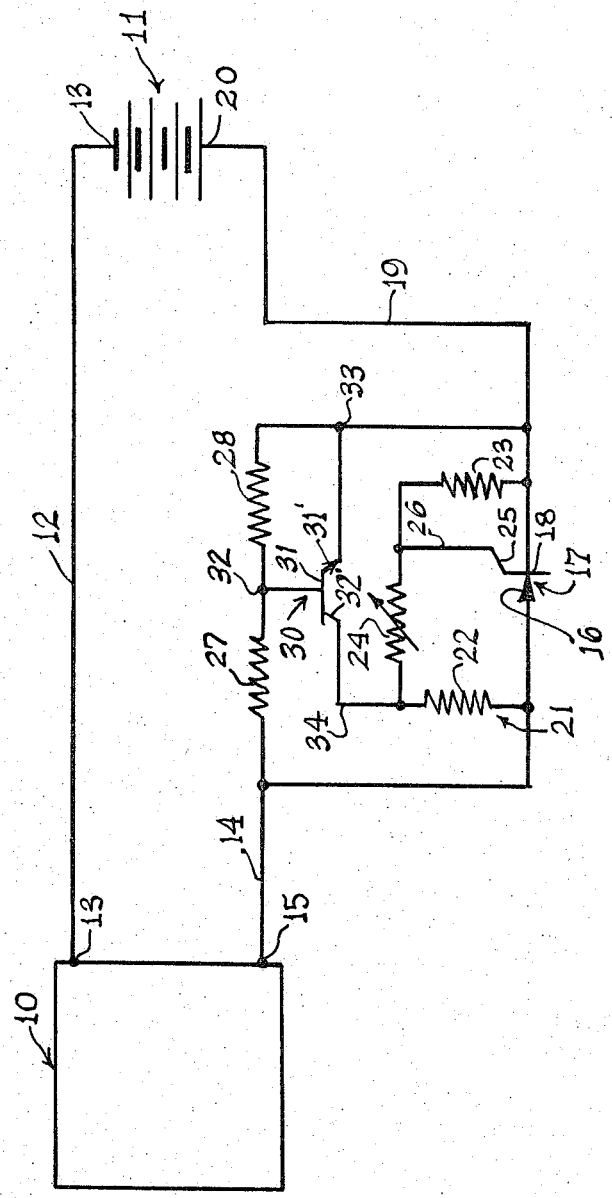

3,365,645
AUTOMATIC BATTERY CHARGER CONTROLS
James J. Jacobs, Chicago, Ill., assignor to Triple-A Specialty Company, Chicago, Ill., a corporation of Illinois
Filed Aug. 2, 1965, Ser. No. 476,338
1 Claim. (Cl. 320—25)

ABSTRACT OF THE DISCLOSURE

A control system for regulating and automatically charging a battery responsive to the continuing change in the charge of the battery until the same is fully charged, including a control which prevents operation of the system when the charger and battery to be charged are incorrectly incorporated electrically to the charger controls.

---

One of the principal objects of my invention is to provide an automatic battery charger which is simple and more efficient than battery chargers used in the art.

Automatic battery charger controls now known and commercially marketed and in use involve or make use of a voltage-sensitized device such as a zener diode to turn the charger off at a predetermined voltage set forth by the zener diode. With such controls, a major circuit is necessary when the cut-off potential is changed. This occurs when different voltage batteries are to be charged. Furthermore, the present-day controls necessitate connecting the control to both of the D.C. leads of the charger or the battery. In some cases it is also necessary to provide means to start the charge when the battery to be charged is completely dead.

The novel and improved automatic battery charger control which is the subject of my invention, makes use of the fact that in order to charge any battery the potential at the output terminals of the charger must be higher than the potential across the battery. As the battery approaches a fully charged condition, the difference in potential between the terminals of the charger and that across the battery, is less. In an ideal case the potential at the charger terminals will be equal to that of the battery and no current will flow; however, this is not practical as recharging the battery under such condition would be too time-consuming.

My improved automatic battery charger has for its object overcoming the difficulties and objectionable features which are encountered by the use of chargers now on the market.

Another and equally important feature of my automatic battery charger control is the incorporation therein of a polarity protector such that if the poles of the battery are not connected in harmony with the poles of the charger, no current will be caused to flow from the charger nor will current be drawn from the battery.

Other objects will appear hereinafter.

The invention consists in the novel combination and arrangement of parts to be hereinafter described and claimed.

The invention will be best understood by reference to the accompanying drawings showing the preferred form of construction, and in which:

The single figure is a schematic drawing of the preferred circuit arrangement embodying my invention.

The automatic battery charger control embodied in my invention is illustrated in the circuit schematically shown in the drawings of this application. In such drawings a battery charger is indicated at 10. The battery to be charged is shown at 11. A circuit wire 12 connects the corresponding poles 13 of the charger and the battery together.

A circuit wire 14 connects the pole 15 of the charger 10 to the anode side 16 of a silicon-controlled rectifier 17. The cathode 18 of such rectifier by a circuit wire 19 is connected to the other pole 20 of the battery 11.

A triggering circuit is indicated generally at 21. Through this triggering circuit current will flow when the supply potential from the charger is higher than the potential of the battery, to trigger the rectifier 17 into a conducting state. The triggering circuit comprises a pair of fixed resistors 22 and 23 and a variable resistor 24, the latter controlling the potential between the gate 25 of the rectifier and the cathode, at which the rectifier 17 is returned to a non-conductive condition. The resistors 22, 23 and 24 are connected in series. The gate 25 of the rectifier 17 by a conductor wire 26 is connected between the variable resistor 24 and the fixed resistor 23.

The difference between the supply potential of the charger 10 and the potential of the battery 11 causes a current to flow through the resistors 22, 24 and 23. The voltage drop across the resistor 24 is of a polarity such that the rectifier 17 is triggered into a conducting state by the positive potential at the gate 25. As the battery 11 becomes fully charged, the difference in potential between the anode side and the cathode side of the rectifier 17 is less, thereby causing less current to flow through the resistors 22, 24 and 23. At a predetermined decrease in the potential between the anode side 16 and cathode side 18 of the rectifier 17 by reason of the charging of the battery 11 the current through such rectifier 17 will become so low that the same can no longer conduct even with a minimum positive voltage on the gate 25, and thus the apparatus will stop conducting current, thereby disconnecting the battery from the charger. This potential value, as before stated, may be adjusted, if necessary, through the medium of the variable resistor 24.

By the use of my automatic battery charger control, it is not necessary to provide means of starting the charge on a completely dead battery, since such battery will present the maximum difference in potential between the charger and the battery, thereby causing an immediate flow of maximum current from the charger to the battery.

Incorporated in my improved automatic battery charger control is a polarity protector circuit. Such circuits includes resistors 27 and 28 connected in series, with the resistor 27 connected to the pole side 15 of the charger, and the resistor 28 connected to the pole side 20 of the battery. A transistor 30 has its base 31 connected as at 32 between the resistors 27 and 28. The emitter 31' of the transistor is connected as at 33 to the pole side 20 of the battery 11. The collector 32' of the transistor 30 is connected by a conductor wire 34 to one side of the resistor 22 as shown in the single figure.

If the poles of the battery 11 are not connected in harmony with the poles of the charger, the potential of the battery will add to that of the charger, causing the potential at the anode and cathode side of the rectifier 17 to go from low voltage to a voltage equal to approximately twice that of the battery. The potential at the cathode side of the rectifier 17 also changes from a positive to a negative potential. When the transistor 30 is in a conducting state, the full voltage will appear across the transistor 30 and resistor 22. Since the drop in voltage across the collector 32' to the emitter 31' is small, the full voltage will be across the resistor 22. The anode side of the rectifier 17 will then be positive and the resistors 22 and 24 will then be negative. This negative potential will also appear at the gate 25 of the rectifier 17. The conduction of the transistor 30 will effectively short out any gate signal, thereby opening the circuit between the battery 11 and the charger. This open circuit precludes the possibility of damage to either the charger, the battery, or to the electrical system in which the charger and battery are incorporated.

From the foregoing description read in connection with the drawing, it will be apparent that I have provided an automatic battery charger which is simple in construction and which will be highly efficient in use and one which is operable to effectively charge the battery regardless of its run-down condition.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claim.

Having thus described my invention, what I claim as new and desire to protect by Letters Patent is:

1. An automatic battery charger control wherein a charger is used to charge a battery comprising
   (a) a silicon-controlled rectifier of the type having an anode and a cathode and a gate electrode, which latter when electrically charged conditions the rectifier so that current is allowed to flow from the anode to the cathode,
   (b) a circuit connection between one pole of the charger and the anode of the rectifier,
   (c) a circuit connection between the cathode and one pole of the battery having the same polarity as that of the pole of the charger,
   (d) a triggering circuit for said rectifier and through which current flows when the supply potential from the charger is higher than the potential of the battery, to trigger the rectifier into a conducting state,
   (e) said triggering circuit comprises a pair of fixed resistors connected in series on opposite sides of a variable resistor, and with one of said fixed resistors connected to the anode side of the rectifier and the other fixed resistor connected to the cathode side of the rectifier,
   (f) and a conductor connecting said gate electrode between said variable resistor and one of said fixed resistors;

said charger control further including a polarity protector circuit for said charger and said battery comprising resistors connected in series, with one of said resistors connected to one pole of the charger and the other resistor connected between one pole of the battery and the cathode side of the rectifier, and a transistor having its base connected between said last-mentioned resistors, the collector and emitter of said transistor respectively connected to the fixed resistor on the anode side of the rectifier and the fixed resistor on the cathode side of said rectifier.

References Cited
UNITED STATES PATENTS

| | | | |
|---|---|---|---|
| 3,085,187 | 4/1963 | Godshalk | 320—25 |
| 3,211,964 | 10/1965 | Thorne | 317—151 |
| 3,223,913 | 12/1965 | Kalns et al. | 320—39 |
| 3,296,515 | 1/1967 | Knauth | 320—24 |

JOHN F. COUCH, *Primary Examiner.*

S. M. WEINBERG, *Assistant Examiner.*